US 11,144,637 B1

(12) United States Patent
Curtin et al.

(10) Patent No.: US 11,144,637 B1
(45) Date of Patent: Oct. 12, 2021

(54) SYSTEMS AND METHODS FOR EXECUTING DECISION TREES

(71) Applicant: CA, Inc., San Jose, CA (US)

(72) Inventors: Ryan Curtin, Atlanta, GA (US); Keith Kenemer, Roswell, GA (US)

(73) Assignee: CA, INC., San Jose, CA (US)

(*) Notice: Subject to any disclaimer, the term of this patent is extended or adjusted under 35 U.S.C. 154(b) by 649 days.

(21) Appl. No.: 16/111,772

(22) Filed: Aug. 24, 2018

(51) Int. Cl.
*G06F 21/56* (2013.01)
*G06F 21/55* (2013.01)
*G06K 9/62* (2006.01)

(52) U.S. Cl.
CPC .......... *G06F 21/552* (2013.01); *G06F 21/562* (2013.01); *G06K 9/6281* (2013.01)

(58) Field of Classification Search
CPC .............................. G06F 21/552; G06F 21/562
See application file for complete search history.

(56) References Cited

U.S. PATENT DOCUMENTS

| 2016/0171331 | A1* | 6/2016 | Csefalvay | ............ | G06K 9/3241 382/103 |
| 2017/0011294 | A1* | 1/2017 | Jagannathan | .......... | G06N 5/003 |

* cited by examiner

*Primary Examiner* — Brian F Shaw
(74) *Attorney, Agent, or Firm* — Foley & Lardner LLP

(57) ABSTRACT

The disclosed computer-implemented method for executing decision trees may include (i) executing a security classification decision tree that classifies an input data item, (ii) gathering, simultaneously using a gather instruction, values for both a current threshold at a parent node of the security classification decision tree and a subsequent threshold at a child node of the parent node, (iii) gathering, simultaneously using the gather instruction, values for both a current measurement at the parent node and a subsequent measurement at the child node, (iv) comparing, simultaneously using a comparison instruction, the current threshold at the parent node with the current measurement at the parent node and the subsequent threshold at the child node with the subsequent measurement at the child node, and (v) performing a security action to protect the computing device. Various other methods, systems, and computer-readable media are also disclosed.

20 Claims, 6 Drawing Sheets

SYSTEMS AND METHODS FOR EXECUTING DECISION TREES

BACKGROUND

In the modern marketplace, computer security vendors typically provide endpoint security program products. For example, a computer security vendor may market an endpoint security program product, such as an antivirus product, that executes on a corresponding endpoint computing device, such as a laptop or desktop computer. The endpoint security program product may monitor for candidate security threats at the endpoint computing device. Moreover, upon detecting a candidate security threat, the endpoint security program may also perform one or more remedial actions that attempt to prevent, inoculate, resolve, or otherwise address the detected candidate security threat. For example, the endpoint security program may collect a large number of candidate malware samples having unknown classifications. Subsequently, the endpoint security program may apply a security classification algorithm to one or more of these candidate malware samples in an attempt to detect whether or not any of these samples actually constitutes malware. In some examples, the security classification algorithm may correspond to a security classification decision tree, as discussed further below. Nevertheless, executing the security classification algorithm, such as a security classification decision tree, may be relatively expensive in terms of computational resources, such as time, power, and/or CPU utilization, etc. The instant disclosure, therefore, identifies and addresses a need for improved systems and methods for executing decision trees.

SUMMARY

As will be described in greater detail below, the instant disclosure describes various systems and methods for executing decision trees. In one example, a computer-implemented method for executing decision trees may include (i) executing, by an endpoint software security program to protect the computing device, a security classification decision tree that classifies an input data item, (ii) gathering, simultaneously using a gather instruction, values for both a current threshold at a parent node of the security classification decision tree and a subsequent threshold at a child node of the parent node, (iii) gathering, simultaneously using the gather instruction, values for both a current measurement at the parent node of the security classification decision tree and a subsequent measurement at the child node of the parent node, (iv) comparing, simultaneously using a comparison instruction, the current threshold at the parent node with the current measurement at the parent node and the subsequent threshold at the child node with the subsequent measurement at the child node, and (v) performing, by the endpoint software security program, a security action to protect the computing device based on a classification of the input data item resulting from executing the security classification decision tree.

In one embodiment, the input data item may include a malware sample. In one embodiment, the computer-implemented method may further include loading, simultaneously using a load instruction, values for both a current dimension at the parent node of the security classification decision tree and a subsequent dimension at the child node of the parent node.

In one embodiment, the computer-implemented method may further include packing, simultaneously using a pack instruction, results of the comparing into a sequence of bits such that each bit indicates a result of a respective one of different comparison operations performed simultaneously using the comparison instruction. In one embodiment, gathering, simultaneously using the gather instruction, values for both the current measurement and the subsequent measurement includes further gathering a third value for a third measurement at a second child node of the parent node. Moreover, in this embodiment, gathering, simultaneously using the gather instruction, values for both the current threshold and the subsequent threshold includes further gathering a third value for a third threshold at the second child node of the parent node.

In one embodiment, the comparing further may include simultaneously comparing the third value for the third measurement at the second child node of the parent node with the third threshold at the second child node of the parent node. In one embodiment, the computer-implemented method may further include packing, simultaneously using a pack instruction, results of the comparing into a sequence of bits such that each bit indicates a result of a respective one of different comparison operations performed simultaneously using the comparison instruction. Moreover, in this example, the sequence of bits may include three separate bits for three separate comparison operations.

In one embodiment, the comparing effectively collapses two subsequent dimensions of the security classification decision tree such that operations at both of the two subsequent dimensions of the security classification decision tree are performed simultaneously rather than sequentially. In one embodiment, usage of the comparison instruction effectively accelerates a speed of executing the security classification decision tree. In one embodiment, effectively accelerating the speed of executing the security classification decision tree enables the endpoint security program to perform (i) increasing a number of input data items applied to the security classification decision tree and/or (ii) increasing a size of the security classification decision tree.

In one embodiment, a system for implementing the above-described method may include (i) an execution module, stored in memory, that executes, as part of an endpoint software security program to protect the computing device, a security classification decision tree that classifies an input data item, (ii) a gathering module, stored in memory, that gathers, simultaneously using a gather instruction, values for both a current threshold at a parent node of the security classification decision tree and a subsequent threshold at a child node of the parent node and that gathers, simultaneously using the gather instruction, values for both a current measurement at the parent node of the security classification decision tree and a subsequent measurement at the child node of the parent node, (iii) a comparison module, stored in memory, that compares, simultaneously using a comparison instruction, the current threshold at the parent node with the current measurement at the parent node and the subsequent threshold at the child node with the subsequent measurement at the child node, (iv) a performance module, stored in memory, that performs, as part of the endpoint software security program, a security action to protect the computing device based on a classification of the input data item resulting from executing the security classification decision tree, and (v) at least one physical processor configured to execute the execution module, the gathering module, the comparison module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) execute, by an endpoint software security program to protect the computing device, a security classification decision tree that classifies an input data item, (ii) gather, simultaneously using a gather instruction, values for both a current threshold at a parent node of the security classification decision tree and a subsequent threshold at a child node of the parent node, (iii) gather, simultaneously using the gather instruction, values for both a current measurement at the parent node of the security classification decision tree and a subsequent measurement at the child node of the parent node, (iv) compare, simultaneously using a comparison instruction, the current threshold at the parent node with the current measurement at the parent node and the subsequent threshold at the child node with the subsequent measurement at the child node, and (v) perform, by the endpoint software security program, a security action to protect the computing device based on a classification of the input data item resulting from executing the security classification decision tree.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
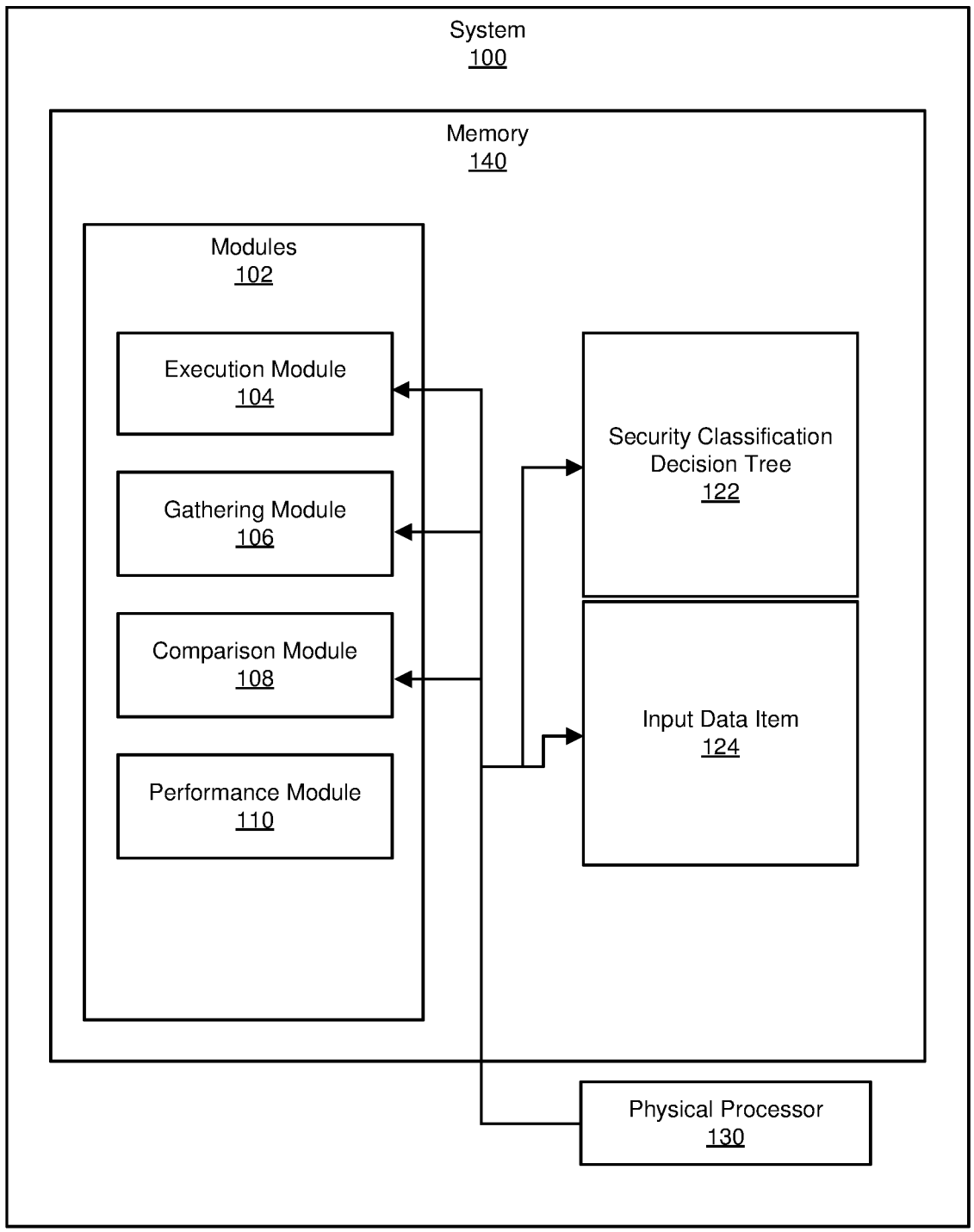
FIG. 1 is a block diagram of an example system for executing decision trees.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for executing decision trees. The disclosed subject matter may improve upon related systems by accelerating a speed of executing a security classification decision tree. In some examples, the disclosed subject matter may accelerate the speed of executing the security classification decision tree by effectively collapsing two different dimensions, or nodes, of the security classification decision tree such that both of the two different dimensions may be executed simultaneously rather than being executed in sequence. Accelerating the speed of executing the security classification decision tree may enable the corresponding endpoint security program to increase the number of files classified by the security classification decision tree and/or increase the size of the security classification decision tree (i.e., thereby increasing the accuracy or sophistication of the security classification decision tree). In general, the disclosed subject matter may achieve this acceleration of the speed of executing the security classification decision tree by leveraging one or more SIMD instructions to perform multiple operations simultaneously according to a parallel computing instruction set.

Figure 2:
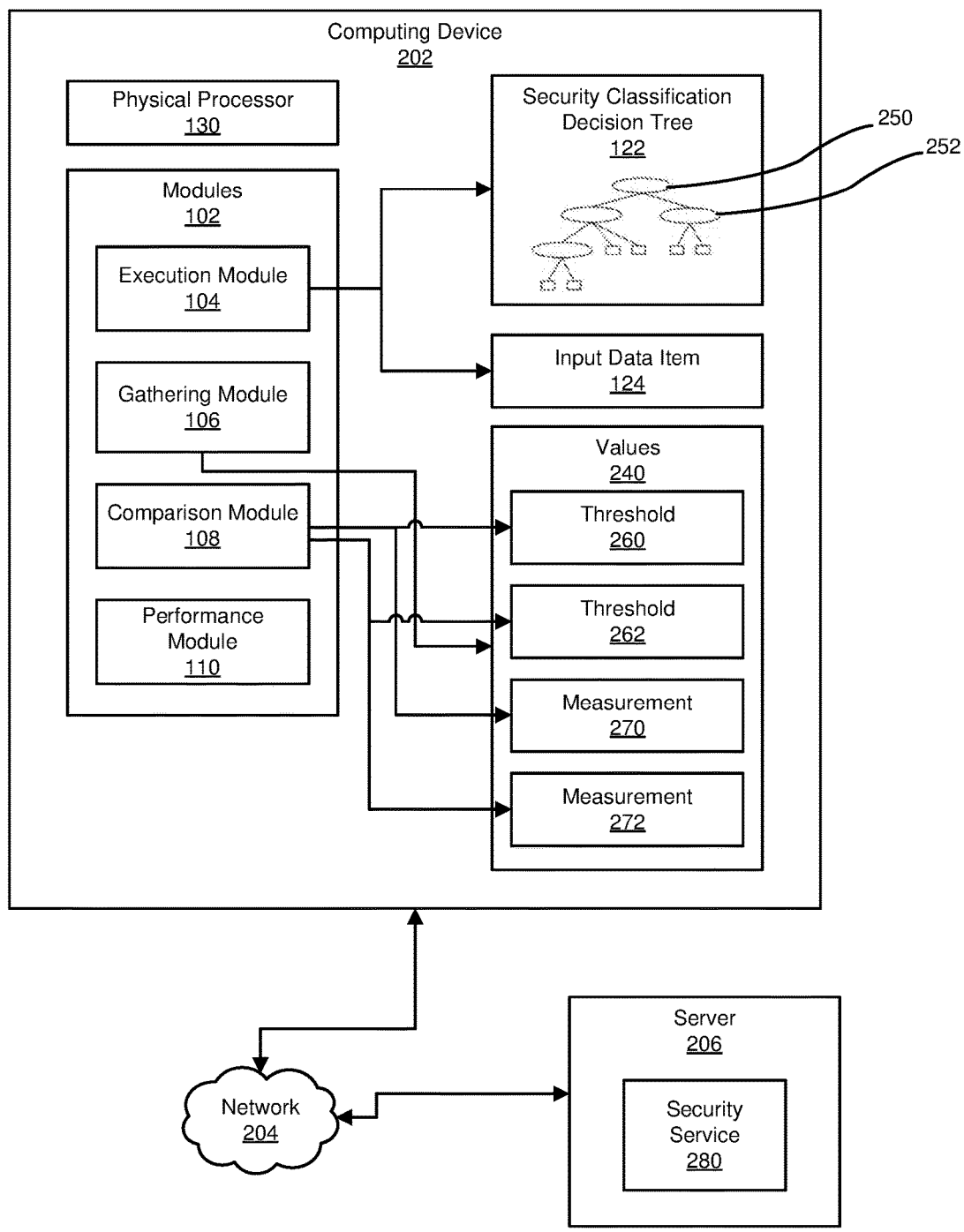
FIG. 2 is a block diagram of an additional example system for executing decision trees.

The following will provide, with reference to FIGS. 1-2, detailed descriptions of example systems for executing decision trees. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for executing decision trees. As illustrated in this figure, example system 100 may include one or more modules 102 for performing one or more tasks. For example, and as will be explained in greater detail below, example system 100 may include an execution module 104 that executes, as part of an endpoint software security program to protect the computing device, a security classification decision tree 122 that classifies an input data item 124. Example system 100 may additionally include a gathering module 106 that gathers, simultaneously using a gather instruction, such as an SIMD gather instruction, values for both a current threshold at a parent node of the security classification decision tree and a subsequent threshold at a child node of the parent node. Gathering module 106 may also gather, simultaneously using the gather instruction, values for both a current measurement at the parent node of the security classification decision tree and a subsequent measurement at the child node of the parent node. Example system 100 may also include a comparison module 108 that compares, simultaneously using a comparison instruction, such as an SIMD comparison instruction, the current threshold at the parent node with the current measurement at the parent node and the subsequent threshold at the child node with the subsequent measurement at the child node. Example system 100 may additionally include a performance module 110 that performs, as part of the endpoint software security program, a security action to protect the computing device based on a classification of input data item 124 resulting from executing security classification decision tree 122. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate executing decision trees. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to execute decision trees.

For example, and as will be described in greater detail below, execution module 104 may execute, as part of an endpoint software security program (corresponding to modules 102) to protect computing device 202, security classification decision tree 122 that classifies input data item 124. Gathering module 106 may gather, simultaneously using a gather instruction, such as an SIMD gather instruction, values for both a current threshold 260 at a parent node 250 of security classification decision tree 122 and a subsequent threshold 262 at a child node 252 of parent node 250. Gathering module 106 may gather, simultaneously using the gather instruction, such as the SIMD gather instruction, values for both a current measurement 270 at parent node 250 of security classification decision tree 122 and a subsequent measurement 272 at child node 252 of the parent node 250. Comparison module 108 may compare, simultaneously using a comparison instruction, such as an SIMD comparison instruction, the current threshold 260 at parent node 250 with the current measurement 270 at parent node 250 and subsequent threshold 262 at child node 252 with subsequent measurement 272 at child node 252. Performance module 110 may perform, as part of the endpoint software security program corresponding to modules 102, a security action to protect computing device 202 based on a classification of input data item 124 resulting from executing security classification decision tree 122.

Computing device 202 generally represents any type or form of computing device capable of reading computer-executable instructions. In one illustrative example, computing device 202 may correspond to a consumer-grade endpoint computing device such as a personal laptop or home desktop. Generally speaking, examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300, as discussed further below in connection with FIG. 3. In one illustrative example, server 206 corresponds to a backend analyzing server that is maintained by a software security product vendor. As further shown in FIG. 2, server 206 may optionally include a security service 280, which may coordinate with modules 102 to perform method 300, as discussed further below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
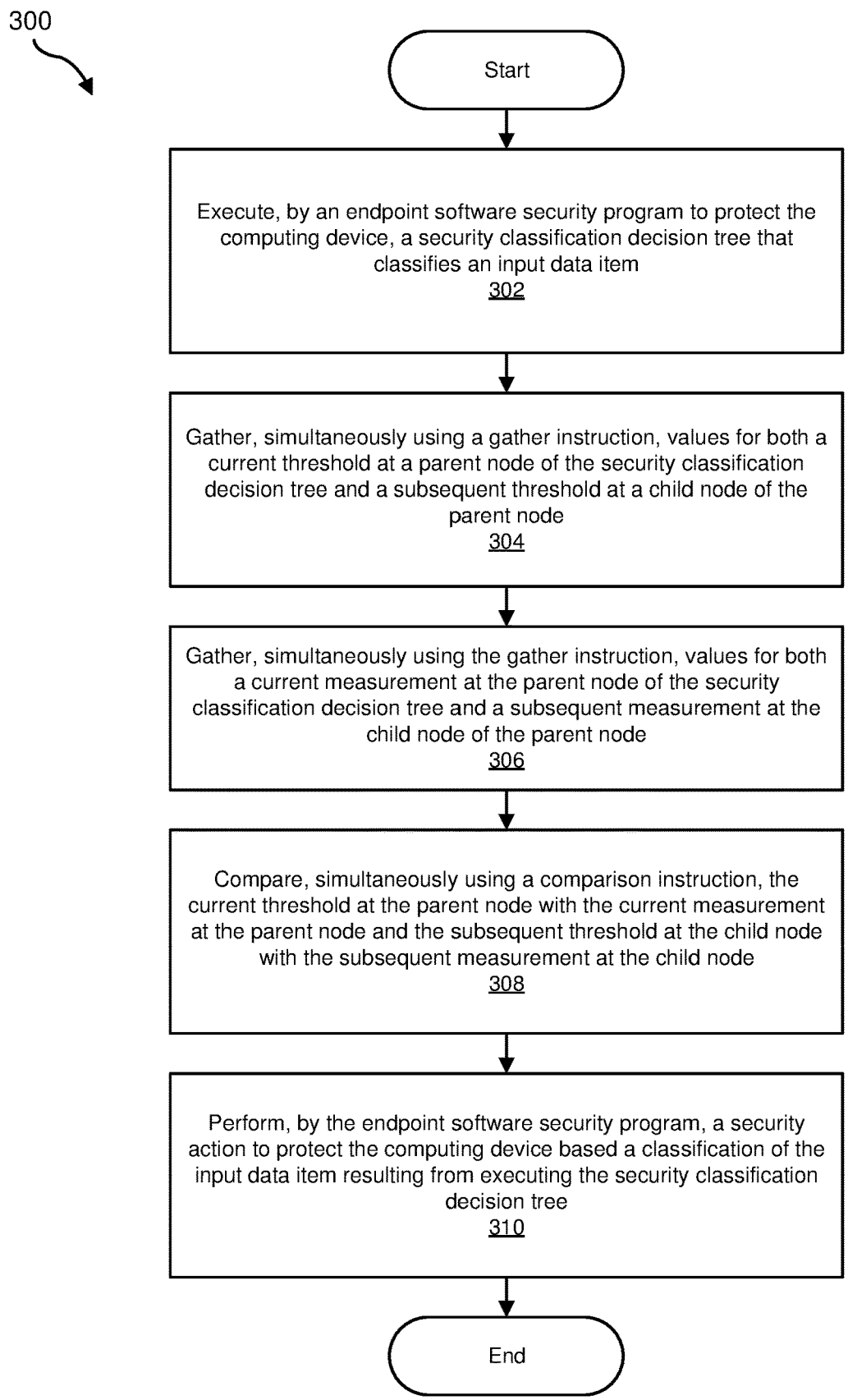
FIG. 3 is a flow diagram of an example method for executing decision trees.

FIG. 3 is a flow diagram of an example computer-implemented method 300 for executing decision trees. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may execute, by an endpoint software security program to protect the computing device, a security classification decision tree that classifies an input data item. For example, execution module 104 may, as part of computing device 202 in FIG. 2, execute, as part of an endpoint software security program to protect computing device 202, security classification decision tree 122 that classifies input data item 124. As used herein, the term "security classification decision trees" generally refers to any mathematical or algorithmic decision tree that, when executed, performs a security analysis of an input item of data to arrive at a binary, probabilistic, or other classification of the input data item. Moreover, as used herein, the term "input data item" generally refers to any item or portion of data that may be analyzed by an endpoint security program as part of a security service to protect a corresponding endpoint computing device. In some illustrative examples, the endpoint data item may include a candidate malware sample or an item of data, such as a file, that has not previously been classified.

Execution module 104 may execute the security classification decision tree in a variety of ways. In general, execution module 104 may execute the security classification decision tree at least in part by identifying, inputting, excepting, retrieving, and/or maintaining the input data item. For example, execution module 104 may, as part of the endpoint software security program, monitor for, collect, and/or maintain one or more input data items. Execution module 104 may identify or detect each new item of data, or file, that interacts with computing device 202. In some examples, the input item of data may correspond to a file, download, and/or item of multimedia content, an executable, a program, a message attachment, etc. Execution module 104 may subsequently execute the security classification decision tree at least in part by applying the security classification decision tree to the input data item. The security classification decision tree may be configured such that applying the input data item to the security classification decision tree may ultimately result in a type of classification of the input data item, such as a binary classification of whether the input data item is safe or unsafe, or probabilistic classification of the input data item indicating an estimated likelihood of whether the input data item indicates a security threat.

Figure 4:
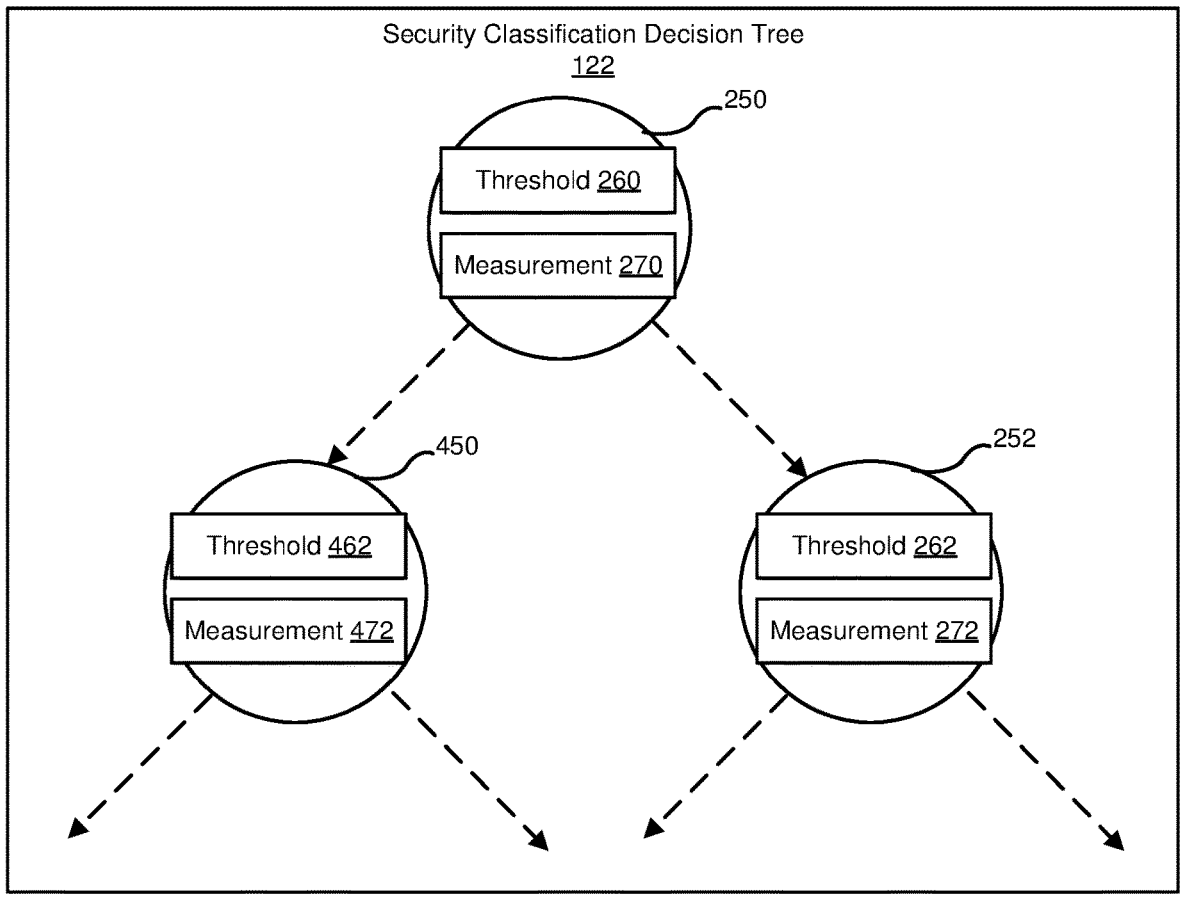
FIG. 4 is a block diagram of an example security classification decision tree.

In general, the security classification decision tree may begin at a root node at the top of the security classification decision tree, which may correspond to the parent node 250 shown in FIG. 2 and discussed further below in connection with FIG. 4. Subsequently, execution module 104 may perform at least one comparison operation, as discussed further below in connection with step 308 of method 300, corresponding to the written note at the top of the security classification decision tree. Execution module 104 may thereafter iteratively traverse the security classification decision tree by performing a subsequent comparison operation at one or more child nodes of the root node. Moreover, when iteratively traversing the security classification decision tree, execution module 104 may select one or more of the child nodes of a specific parent node, such as the root node, based on a result of the comparison operation that was previously performed at the specific parent node.

According to a related system, execution module 104 may only perform one or more comparison operations at a single "dimension" of the security classification decision tree at a time. As used herein, the term "dimension" generally refers to a separate node of the security classification decision tree. In these examples, each one of the nodes of the security classification decision tree may optionally correspond to a different dimension of measurement used to perform comparison operations when traversing the security classification decision tree, as discussed further below. In the example of FIG. 2, root node 250 may correspond to one dimension of the security classification decision tree (i.e., dimension "1"). Similarly, child node 252 may correspond to a second dimension of the security classification decision tree (i.e., dimension "2"). In contrast to these related systems, execution module 104 may optionally perform one or more comparison operations, in accordance with method 300, at multiple dimensions simultaneously. For example, execution module 104 may perform, in coordination with comparison module 108, a comparison operation corresponding to root node 250 and also another comparison operation corresponding to child node 252 simultaneously at step 308, as discussed further below. To perform multiple comparison operations simultaneously, execution module 104 may, in coordination with comparison module 108, leverage one or more parallel computing and/or SIMD or SINGLE INSTRUCTION MULTIPLE DATA instructions corresponding to an SIMD parallel computing architecture instructions set (e.g., according to class of parallel computers in Flynn's taxonomy).

At step 304, one or more of the systems described herein may gather, simultaneously using a gather instruction, such as an SIMD gather instruction, values for both a current threshold at a parent node of the security classification decision tree and a subsequent threshold at a child node of the parent node. For example, gathering module 106 may, as part of computing device 202 in FIG. 2, gather, simultaneously using an SIMD gather instruction, values for both threshold 260 at parent node 250 of security classification decision tree 122 and subsequent threshold 262 at child node 252 of parent node 250. As used herein, the term "parent node" generally refers to any node within a decision tree that is situated as a parent within a parent-child relationship according to the hierarchy of the decision tree. Similarly, as used herein, the term "child node," generally refers to any node within the decision tree that is situated as a child within the parent-child relationship according to the hierarchy of the decision tree. Moreover, as used herein, the phrase "simultaneously" used at step 304 generally refers to gathering the value for the current threshold at the same time as gathering the value for the subsequent threshold (e.g., using a single parallel computing or SIMD instruction).

Moreover, as used herein, the term "current threshold" simply refers to the threshold of a node at a dimension within the security classification decision tree that is currently being executed according to method 300. Similarly, as used herein, the term "subsequent threshold" simply refers to a threshold of a node that follows the parent node when descending the security classification decision tree from top-to-bottom. Importantly, the phrases "current threshold" and "subsequent threshold" simply refer to the descending order, from top-to-bottom, within the security classification decision tree, and do not imply that the corresponding comparison operations for these two different nodes are performed in sequence, rather, as discussed further below in connection with step 308 of method 300, the two corresponding comparison operations are generally performed in parallel using an SIMD comparison operation. The same caveat applies to the terms "current measurement" and "subsequent measurement" in connection with step 306 of method 300, as discussed further below.

By way of background, the security classification decision tree may be configured such that one or more, all, or substantially all of the nodes of the security classification decision tree include corresponding threshold values that form the basis for performing one or more comparison operations when executing the security classification decision tree at that respective node. For example, FIG. 4 illustrates one illustrative embodiment of the security classification decision tree. As further shown in this figure, the security classification decision tree includes at least three nodes, parent node 250 and child node 252, which are discussed above in connection with system 200 shown in FIG. 2, as well as an additional and third node, node 450, which corresponds to a second child node of parent node 250. Moreover, as further shown in this figure, each one of node 250, node 252, and node 450 include a respective threshold for performing a corresponding comparison operation. More specifically, node 250 includes threshold 260, node 252 includes threshold 262, and node 450 includes threshold 462. Accordingly, when the security classification decision tree is executed at a respective one of these nodes, the corresponding threshold may be retrieved and then applied in a comparison operation against a measurement value, as discussed further below in connection with steps 306 and 308 of method 300.

Gathering module 106 may gather the values for the current threshold and the subsequent threshold in a variety of ways. In some examples, prior to gathering module 106 gathering the values for the current threshold in the subject and threshold, gathering module 106 may first gather or load values for the corresponding dimension of the parent node and the child node, which in some embodiments may be required to enable gathering module 106 to perform step 304 by locating where to retrieve the current threshold in the subsequent threshold. More specifically, in one embodiment, gathering module 106 loads, simultaneously using an SIMD load instruction, values for both a current dimension at the parent node of the security classification decision tree and a subsequent dimension at the child node of the parent node. For example, FIG. 4 illustrates how the security classification decision tree includes at least two dimensions. The first dimension may correspond to the root node or parent node 250. Additionally, the second dimension may correspond to child node 252. Moreover, a third dimension may optionally correspond to child node 450. Depending on what indexing system is used, the first dimension corresponding to the root node may constitute "0" or "1," for example. Consequently, the second dimension corresponding to child node 252 may correspond to the value of the first dimension incremented by one (i.e., "1" or "2," respectively, and again depending upon the specific indexing system used to mark the location of the current dimension where the security classification decision tree is executing). In some examples, the "SIMD load operation" and the "SIMD gather operation" may correspond to two different names for what is essentially the same operation defined within the computer architecture instruction set. In other examples, the "SIMD loading operation" and the "SIMD gather operation" may correspond to two distinct operations separately defined within the computer architecture instruction set.

In general, gathering module 106 may gather the two values for the two respective thresholds simultaneously using an SIMD instruction. For example, after optionally loading the values for the dimension of the parent node and the dimension of the child node, gathering module 106 may subsequently gather the value for the current threshold, which may be stored within one memory location of a computer architecture, and gathering module 106 may also gather the value for the subsequent threshold, which may be stored within another memory location of the same computer architecture. In these examples, gathering module 106 may optionally use the two values loaded for the first dimension and the second dimension to reference the locations for retrieving the values for the current threshold and the subsequent threshold. Moreover, the computer architecture may provide an SIMD gather instruction that may gather the current threshold from the first memory location into one register of the computer architecture and also simultaneously gather the subsequently threshold from the second memory location into another register of the computer architecture. For example, the SIMD gather instruction may be executed using parameters that specify one or more of the first memory location, the second memory location, a register for receiving the current threshold, and a register for receiving the subsequent threshold. In additional or alternative examples, another variable, data structure, hardware component, or other memory holding unit may be used in place of one or both of the registers of the computer architecture.

In some examples, gathering module 106 may simultaneously gather three separate values for three separate nodes, one parent node and two child nodes, rather than gathering to separate values for just the single parent node and the single child node. Returning to the example of FIG. 4, gathering module 106 may optionally gather, simultaneously, threshold 260 for parent node 250, threshold 262 for child node 252, and threshold 462 for child node 450. In this example, gathering module 106 may gather the three separate values for these three separate thresholds in a manner that parallels the example outlined above for gathering the two separate values for the parent node and the child node. More specifically, gathering module 106 may gather the three separate values for these three separate thresholds by optionally specifying three separate locations where the values are located and also by optionally specifying registers, variables, data structures, or other data holding units for receiving the respective values of these thresholds. In these examples, gathering module 106 may also optionally gather, simultaneously, three separate values for three separate dimensions prior to gathering the three separate values for the three separate thresholds. For example, gathering module 106 may first simultaneously gather the three values for the three dimensions by executing a command such as "SIMD load of dimensions i, j, k." Subsequently, gathering module 106 may simultaneously gather the three values for the three thresholds at the specific dimensions executing commands such as, "SIMD gather of thresholds T[i], T[j], T[k]."

At step 306, one or more of the systems described herein may gather, simultaneously using the gather instruction, such as the SIMD gather instruction, values for both a current measurement at the parent node of the security classification decision tree and a subsequent measurement at the child node of the parent node. For example, gathering module 106 may, as part of computing device 202 in FIG. 2, gather, simultaneously using the SIMD gather instruction, values for both a current measurement at the parent node of the security classification decision tree and a subsequent measurement at the child node of the parent node. As used herein, the term "measurement" generally refers to any field or attribute of the data item being classified using the security classification decision tree. As one illustrative example, a measurement of a candidate malware sample may include the file name of the candidate malware sample. Similarly, a corresponding threshold that may be used to compare against the measurement may correspond to a file name length of 10 characters or more, where filenames having links greater than 10 characters indicate a greater likelihood that the candidate malware sample actually constitutes malware (or vice versa). Of course, the measurement may additionally or alternatively, correspond to any other attribute or metadata describing the underlying data item being classified according to the security classification decision tree. Moreover, the phrase "simultaneously" as used at step 306 generally refers to gathering the value for the current measurement at the same time as gathering the value for the subsequent measurement (e.g., using a single parallel computing or SIMD instruction).

Although FIG. 3 illustrates step 306 as performed subsequent to step 304, in other examples step 306 may be performed before step 304. Moreover, in other examples step 306 and step 304 may be performed simultaneously. Step 304 and step 306 corresponded to respective variable loading operations that simply load values in order to enable the comparison operation that is performed at step 308 and, therefore, the order of loading these values is not relevant and any suitable order will do as long as all of the requisite values have been appropriately loaded prior to performing step 308.

Gathering module 106 may gather the two values for the two measurements at step 306 in a variety of ways. In general, gathering module 106 may gather the two values simultaneously using another instance of executing the parallel computing or SIMD gather operation. Accordingly, gathering module 106 may gather the two values for the two measurements in a manner that parallels how gathering module 106 gathered the two values for the thresholds at step 304, as further described above. Similarly, and in parallel to the discussion of step 304 above, gathering module 106 may, at step 306, also optionally gather three separate values for three separate measurements corresponding to three separate nodes of the security classification decision tree. For example, returning to FIG. 4, gathering module 106 may optionally gather, simultaneously, the value for measurement 270 at node 250, the value for measurement 272 at node 252, and also the value for measurement 472 at node 450. For example, gathering module 106 may optionally execute a command such as "SIMD gather of values D[i], D[j], D[k]."

At step 308, one or more of the systems described herein may compare, simultaneously using a comparison instruction, such as an SIMD comparison instruction, the current threshold at the parent node with the current measurement at the parent node and the subsequent threshold at the child node with the subsequent measurement at the child node. For example, comparison module 108 may, as part of computing device 202 in FIG. 2, compare, simultaneously using an SIMD comparison instruction, current threshold 260 at parent node 250 with current measurement 270 at parent node 250 and subsequent threshold 262 at child node 252 with subsequent measurement 272 at child node 252. Moreover, as used herein, the phrasing of step 308 generally refers to simultaneously performing two distinct comparison operations: (i) a comparison between current threshold 260 at parent node 250 with current measurement 270 at parent node 250 and (ii) a comparison between subsequent threshold 262 at child node 252 with subsequent measurement 272 at child node 252.

Comparison module 108 may perform the comparison operation of step 308 in a variety of ways. In general, comparison module 108 may perform the comparison operation by executing a single parallel computing or SIMD comparison operation that results in simultaneously performing two respective and underlying comparison operations, as further discussed above. In some examples, comparison module 108 may perform three separate comparison operations simultaneously, as discussed further above in comparison with the "three value" embodiments at step 304 and step 306. For example, FIG. 4 illustrates how comparison module 108 may simultaneously perform the following three comparisons: (i) a comparison between current threshold 260 at parent node 250 with current measurement 270 at parent node 250, (ii) a comparison between subsequent threshold 262 at child node 252 with subsequent measurement 272 at child node 252, and (iii) a comparison between threshold 462 at child node 450 with measurement 472 at child node 450. In this example, comparison module 108 may optionally execute a command such as "SIMD comparison of (D[i], T[i]), (D[j], T[j]), (D[k], T[k]), where "D" refers to a measurement, "T" refers to a threshold, and "i," "j," and "k" refer to the corresponding dimension.

Furthermore, subsequent to comparison module 108 performing comparison step 308, comparison module 108 may also optionally perform a packing step using a corresponding pack instruction, such as a SIMD pack instruction. For example, the comparison operation performed at step 308 may load or store the result of each respective underlying parallel comparison operation within a separate register, variable, data structure, and/or other data holding unit. Moreover, the data holding unit may include a larger number of bits than the single bit that is, according to some embodiments, needed to indicate the result of the comparison operation. For example, the comparison SIMD operation may store a result of one of the underlying parallel comparison operations within a register that has 4, 8, 16, 32, 64, 128, or any other suitable number of bits. In the case of an 8-bit register, a positive result of the underlying parallel comparison operation may be stored as "00000001." Similarly, in the case of another 8-bit register, a negative result of an additional indistinct underlying parallel comparison operation may be stored as "00000000." In these examples, the registers or other data holding units may include a large number of unused bit space (i.e., because only one of the bits is used to indicate the result of the respective comparison operation). Accordingly, comparison module 108 may optionally perform a packing step that backs the results from two or more underlying parallel comparison operations into a single register, data structure, or other data holding unit. For example, comparison module 108 may optionally pack the results from two respective underlying parallel comparison operations into a sequence of two bits, such as "01" or "11." Similarly, in the case of the "three value" embodiment, comparison module 108 may optionally pack the results from three respective underlying parallel comparison operations into a sequence of three bits, such as "101" or "000."

Moreover, in the example of gathering module 106 optionally gathering three values simultaneously for one or more of the dimensions, measurements, or thresholds, and then subsequently comparison module 108 performing the three separate comparison operations simultaneously, system 200 including execution module 104 may optionally not use, or discard, the results of one or more of these comparison operations when traversing the security classification decision tree. In other words, according to the conventional traversal of a security classification decision tree, the results of the comparison operation performed at a parent node may determine which one or more child nodes should determine subsequent comparison operations. In the example of FIG. 4, a conventional traversal of the security classification decision tree may only perform either the comparison operation corresponding to child node 252 or, instead, the comparison operation corresponding to child node 450, depending on the results of previously performing the comparison operation corresponding to parent node 250. In contrast, one or more of the embodiments disclosed herein may result in both the comparison operation corresponding child node 252 in the comparison operation corresponding to child node 450 being performed, simultaneously.

In these examples, both of these comparison operations may be performed, even though the results of only one of these comparison operations may ultimately be used in the algorithm classifying the input data item, because these comparison operations are performed simultaneously with a comparison operation corresponding to parent node 250 and, therefore, the results of the comparison operation at parent node 250 are not yet available to indicate which one of the child node comparison operations should be performed selectively. Moreover, the usage of the SIMD comparison operation may use parallel computing operations such that, even though both comparison operations are performed, the additional performance of the second comparison operation does not increase computational overhead in comparison to the conventional and sequential traversal of the security classification decision tree that is further outlined above. Accordingly, usage of the SIMD comparison operation does not negatively impact usage of computational resources such as time and CPU cycles, despite the fact that the results of one of the child node comparison operations may optionally be discarded by the algorithm ultimately classifying the input data item.

In some examples, comparison module 108 performing the comparison operation of step 308 may effectively collapse two subsequent dimensions of the security classification decision tree such that operations at both of the two subsequent dimensions of the security classification decision tree are performed simultaneously rather than sequentially. For example, comparison module 108 may effectively collapse the dimension at parent node 250 with the dimension at child node 252. Additionally, in the "three value" embodiment, comparison module 108 may effectively collapse the three separate dimensions at parent node 250, child node 252, and child node 450. Additionally or alternatively, usage of the SIMD comparison instruction by comparison module 108 effectively accelerates a speed of executing the security classification decision tree. Optionally in these embodiments, effectively accelerating the speed of executing the security classification decision tree by comparison module 108 enables the endpoint security program to perform at least one of increasing a number of input data items applied to the security classification decision tree and increasing a size of the security classification decision tree, over a single span of time.

At step 310, one or more of the systems described herein may perform, as part of the endpoint software security program, a security action to protect the computing device based on a classification of the input data item resulting from executing the security classification decision tree. For example, performance module 110 may, as part of computing device 202 in FIG. 2, perform a security action to protect computing device 202 based on a classification of input data item 124 resulting from executing security classification decision tree 122.

Performance module 110 may perform the security action in a variety of ways. As used herein, the term "security action" generally refers to any action that the endpoint software security program may take, either automatically, autonomously, and/or in coordination with a human user or administrator, to protect the computing device. Illustrative examples of the security action may include (i) enabling or heightening one or more security settings, (ii) updating the software security program and/or a corresponding antivirus/malware definition set, (iii) disabling, deleting, quarantining, sandboxing, powering down, and/or disconnecting one or more computing resources (including optionally the input data item or candidate malware sample), (iv) issuing an alert or warning to a human user or administrator, (v) saving, storing, and/or preserving one or more items of data or other computing resource, and/or (vi) executing one or more antivirus or inoculation script, including optionally one or more antivirus or inoculation script that is specifically tailored to address a corresponding security threat indicated by the classified input data item (e.g., in inoculation script that is tailored to, or matches, a malware sample classified according to the security classification decision tree).

As outlined above, the disclosed subject matter may improve upon related systems by accelerating a speed of executing a security classification decision tree. In some examples, the disclosed subject matter may accelerate the speed of executing the security classification decision tree by effectively collapsing two different dimensions, or nodes, of the security classification decision tree such that both of the two different dimensions may be executed simultaneously rather than being executed in sequence. Accelerating the speed of executing the security classification decision tree may enable the corresponding endpoint security program to increase the number of files classified by the security classification decision tree and/or increase the size of the security classification decision tree (i.e., thereby increasing the accuracy or sophistication of the security classification decision tree). In general, the disclosed subject matter may achieve this acceleration of the speed of executing the security classification decision tree by leveraging one or more SIMD instructions to perform multiple operations simultaneously according to a parallel computing instruction set.

Figure 5:
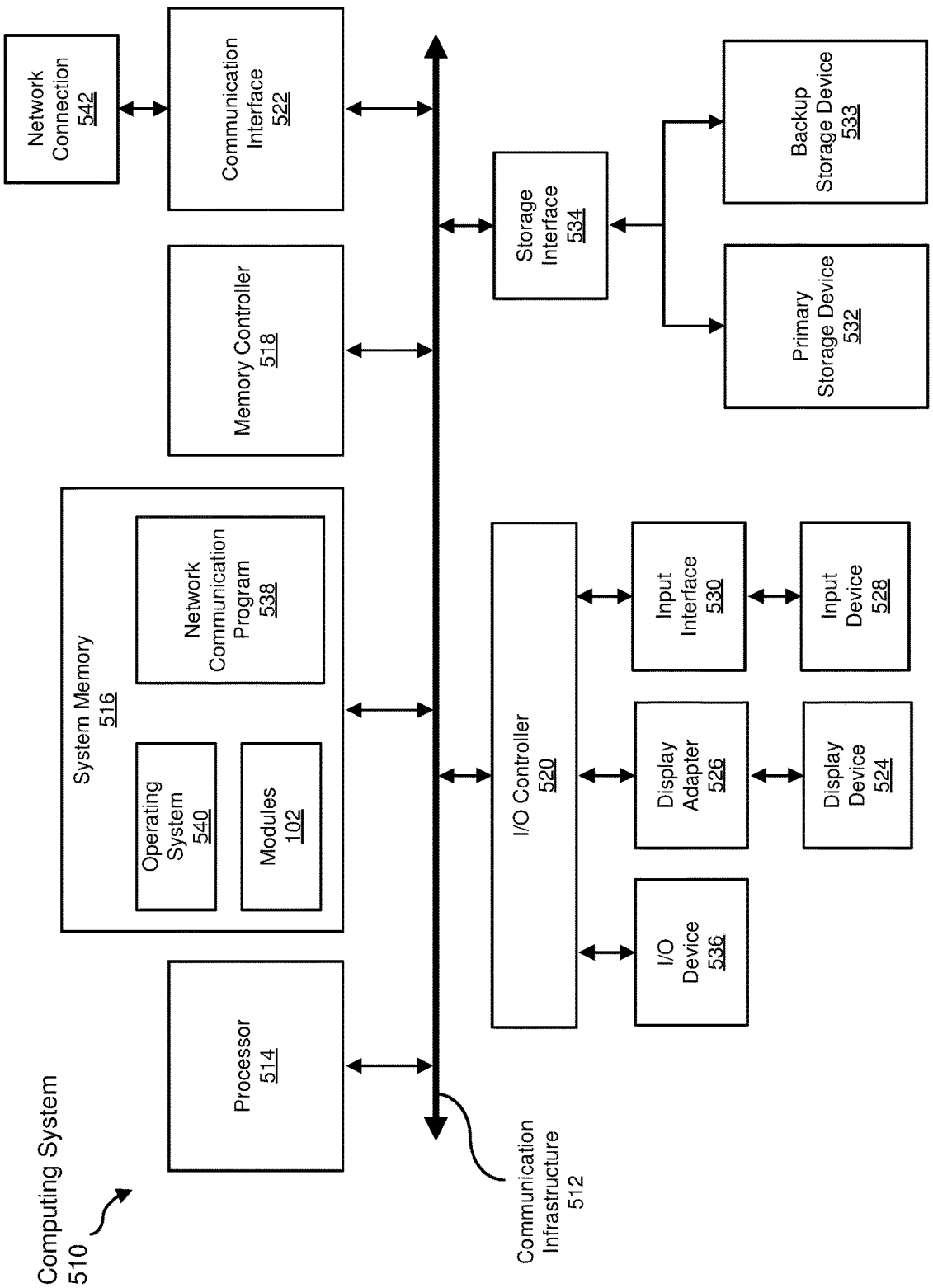
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
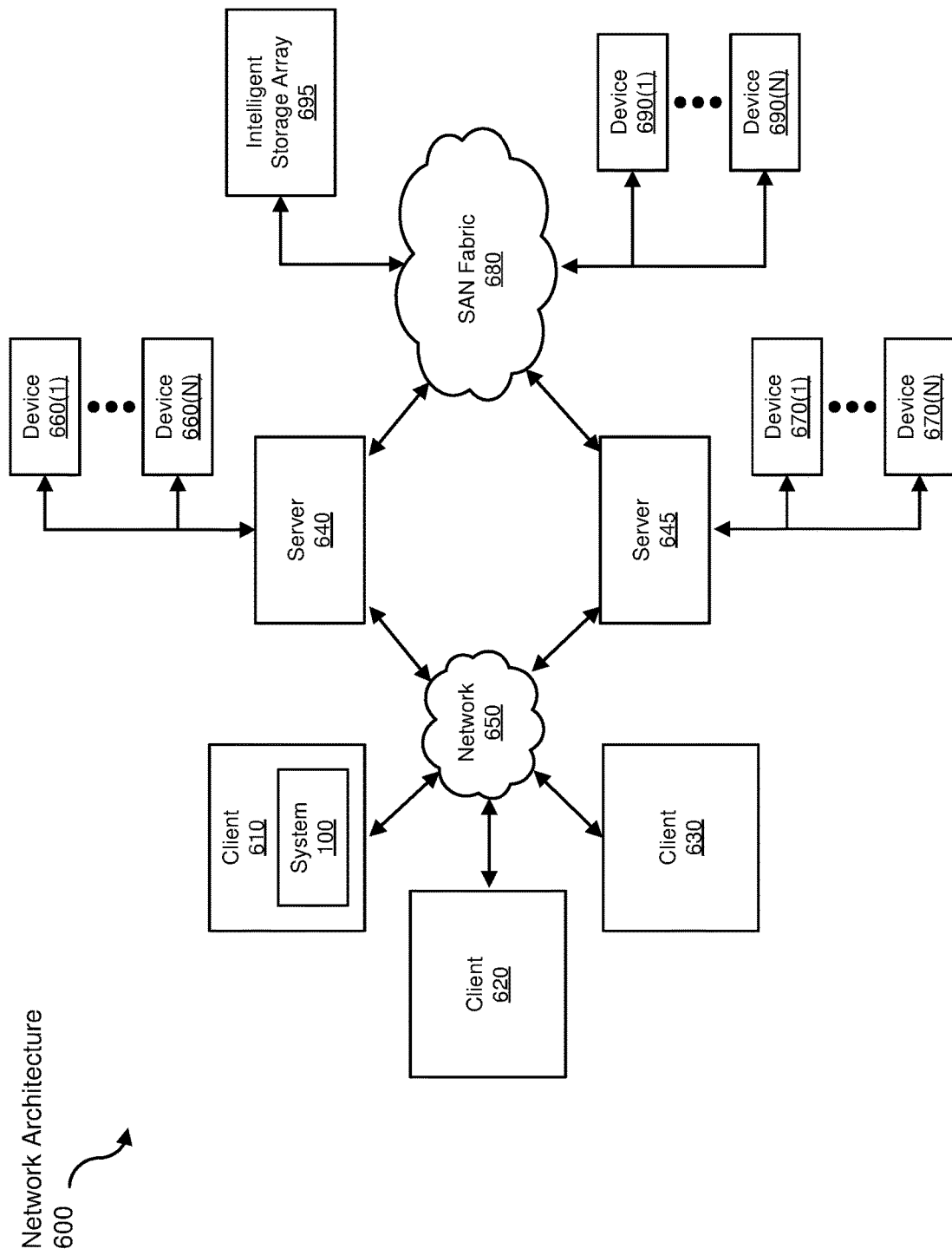
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for executing decision trees.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for executing decision trees, at least a portion of the method being performed by a computing device comprising at least one processor, the method comprising:
    executing, by an endpoint software security program to protect the computing device, a security classification decision tree that classifies an input data item;
    gathering, simultaneously using a gather instruction, values for both a current threshold at a parent node of the security classification decision tree and a subsequent threshold at a child node of the parent node;
    gathering, simultaneously using the gather instruction, values for both a current measurement at the parent node of the security classification decision tree and a subsequent measurement at the child node of the parent node;
    comparing, simultaneously using a comparison instruction, the current threshold at the parent node with the current measurement at the parent node and the subsequent threshold at the child node with the subsequent measurement at the child node; and
    performing, by the endpoint software security program, a security action to protect the computing device based on a classification of the input data item resulting from executing the security classification decision tree.

2. The computer-implemented method of claim 1, wherein the input data item comprises a malware sample.

3. The computer-implemented method of claim 1, further comprising loading, simultaneously using a load instruction, values for both a current dimension at the parent node of the security classification decision tree and a subsequent dimension at the child node of the parent node.

4. The computer-implemented method of claim 1, further comprising packing, simultaneously using a pack instruction, results of the comparing into a sequence of bits such that each bit indicates a result of a respective one of different comparison operations performed simultaneously using the comparison instruction.

5. The computer-implemented method of claim 1, wherein:
    gathering, simultaneously using the gather instruction, values for both the current measurement and the subsequent measurement comprises further gathering a third value for a third measurement at a second child node of the parent node; and
    gathering, simultaneously using the gather instruction, values for both the current threshold and the subsequent threshold comprises further gathering a third value for a third threshold at the second child node of the parent node.

6. The computer-implemented method of claim 5, wherein the comparing further comprises simultaneously comparing the third value for the third measurement at the second child node of the parent node with the third threshold at the second child node of the parent node.

7. The computer-implemented method of claim 5, further comprising packing, simultaneously using a pack instruction, results of the comparing into a sequence of bits such that each bit indicates a result of a respective one of different comparison operations performed simultaneously using the comparison instruction, the sequence of bits comprising three separate bits for three separate comparison operations.

8. The computer-implemented method of claim 1, wherein the comparing effectively collapses two subsequent dimensions of the security classification decision tree such that operations at both of the two subsequent dimensions of the security classification decision tree are performed simultaneously rather than sequentially.

9. The computer-implemented method of claim 1, wherein usage of the comparison instruction effectively accelerates a speed of executing the security classification decision tree.

10. The computer-implemented method of claim 9, wherein effectively accelerating the speed of executing the security classification decision tree enables the endpoint security program to perform at least one of:
increasing a number of input data items applied to the security classification decision tree; or
increasing a size of the security classification decision tree.

11. A system for executing decision trees, the system comprising:
an execution module, stored in memory, that executes, as part of an endpoint software security program to protect a computing device, a security classification decision tree that classifies an input data item;
a gathering module, stored in memory, that:
gathers, simultaneously using a gather instruction, values for both a current threshold at a parent node of the security classification decision tree and a subsequent threshold at a child node of the parent node; and
gathers, simultaneously using the gather instruction, values for both a current measurement at the parent node of the security classification decision tree and a subsequent measurement at the child node of the parent node;
a comparison module, stored in memory, that compares, simultaneously using a comparison instruction, the current threshold at the parent node with the current measurement at the parent node and the subsequent threshold at the child node with the subsequent measurement at the child node;
a performance module, stored in memory, that performs, as part of the endpoint software security program, a security action to protect the computing device based on a classification of the input data item resulting from executing the security classification decision tree; and
at least one physical processor configured to execute the execution module, the gathering module, the comparison module, and the performance module.

12. The system of claim 11, wherein the input data item comprises a malware sample.

13. The system of claim 11, wherein the gathering module further loads, simultaneously using a load instruction, values for both a current dimension at the parent node of the security classification decision tree and a subsequent dimension at the child node of the parent node.

14. The system of claim 11, wherein the comparison module further packs, simultaneously using a pack instruction, results of the comparing into a sequence of bits such that each bit indicates a result of a respective one of different comparison operations performed simultaneously using the comparison instruction.

15. The system of claim 11, wherein:
the gathering module gathers, simultaneously using the gather instruction, values for both the current measurement and the subsequent measurement at least in part by further gathering a third value for a third measurement at a second child node of the parent node; and
the gathering module gathers, simultaneously using the gather instruction, values for both the current threshold and the subsequent threshold at least in part by further gathering a third value for a third threshold at the second child node of the parent node.

16. The system of claim 15, wherein the comparison module further simultaneously compares the third value for the third measurement at the second child node of the parent node with the third threshold at the second child node of the parent node.

17. The system of claim 15, wherein the comparison module packs, simultaneously using a pack instruction, results of the comparing into a sequence of bits such that each bit indicates a result of a respective one of different comparison operations performed simultaneously using the comparison instruction, the sequence of bits comprising three separate bits for three separate comparison operations.

18. The system of claim 11, wherein the comparison module effectively collapses two subsequent dimensions of the security classification decision tree such that operations at both of the two subsequent dimensions of the security classification decision tree are performed simultaneously rather than sequentially.

19. The system of claim 11, wherein usage of the comparison instruction effectively accelerates a speed of executing the security classification decision tree.

20. A non-transitory computer-readable medium comprising one or more computer-readable instructions that, when executed by at least one processor of a computing device, cause the computing device to:
execute, by an endpoint software security program to protect the computing device, a security classification decision tree that classifies an input data item;
gather, simultaneously using a gather instruction, values for both a current threshold at a parent node of the security classification decision tree and a subsequent threshold at a child node of the parent node;
gather, simultaneously using the gather instruction, values for both a current measurement at the parent node of the security classification decision tree and a subsequent measurement at the child node of the parent node;
compare, simultaneously using a comparison instruction, the current threshold at the parent node with the current measurement at the parent node and the subsequent threshold at the child node with the subsequent measurement at the child node; and
perform, by the endpoint software security program, a security action to protect the computing device based on a classification of the input data item resulting from executing the security classification decision tree.

* * * * *